(No Model.) 5 Sheets—Sheet 1.

T. DEAKIN.
VALVE GEAR FOR REGULATING THE SPEED OF MOTORS.

No. 464,661. Patented Dec. 8, 1891.

Witnesses
Inventor
Thomas Deakin
By his attorneys (No Model.) 5 Sheets—Sheet 2.

T. DEAKIN.
VALVE GEAR FOR REGULATING THE SPEED OF MOTORS.

No. 464,661. Patented Dec. 8, 1891.

Witnesses
H. deVros
E. L. Richards

Inventor
Thomas Deakin
By his Attorney (No Model.) 5 Sheets—Sheet 3.
T. DEAKIN.
VALVE GEAR FOR REGULATING THE SPEED OF MOTORS.
No. 464,661. Patented Dec. 8, 1891.
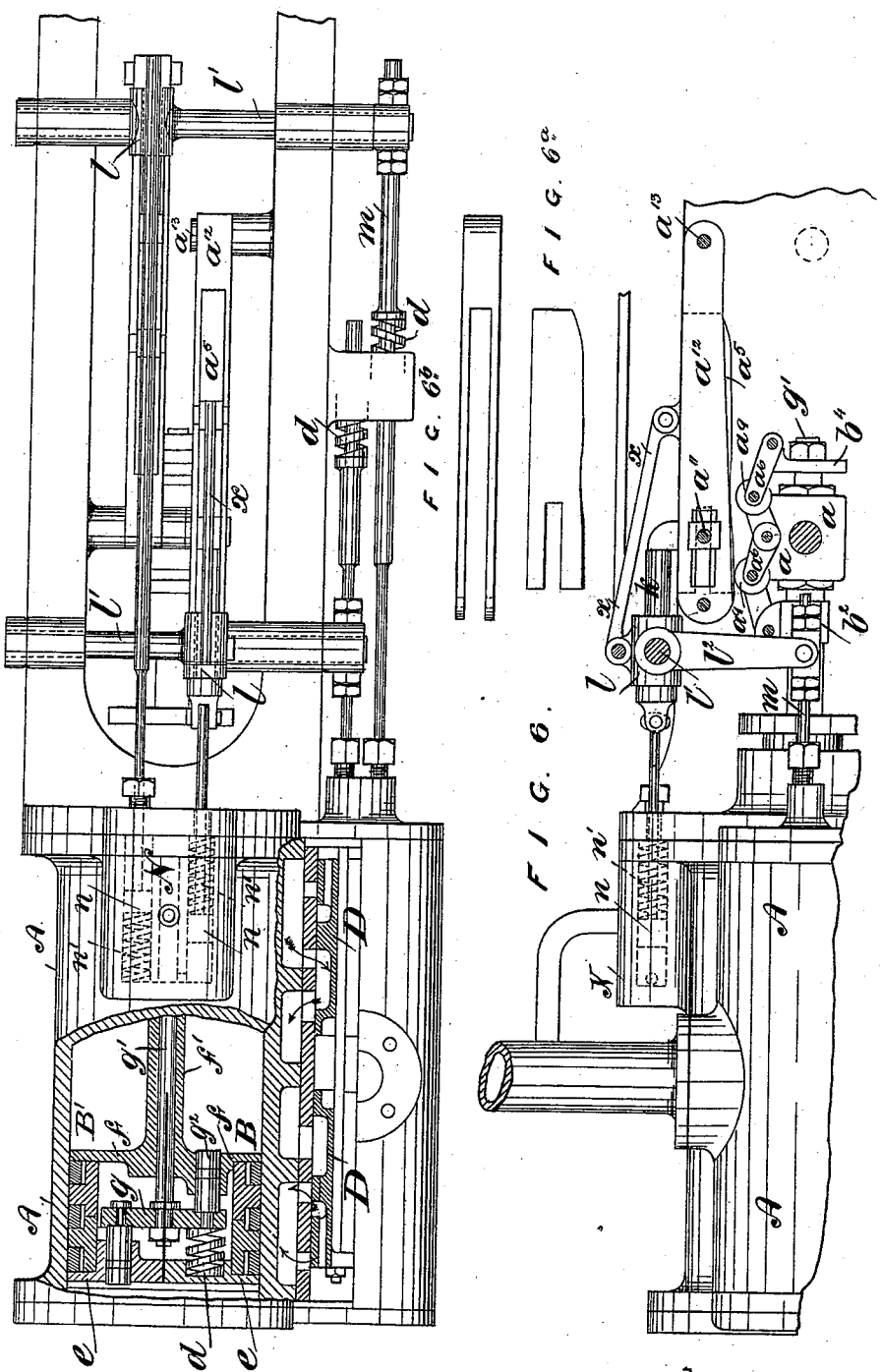

(No Model.) 5 Sheets—Sheet 4.
T. DEAKIN.
VALVE GEAR FOR REGULATING THE SPEED OF MOTORS.
No. 464,661. Patented Dec. 8, 1891.
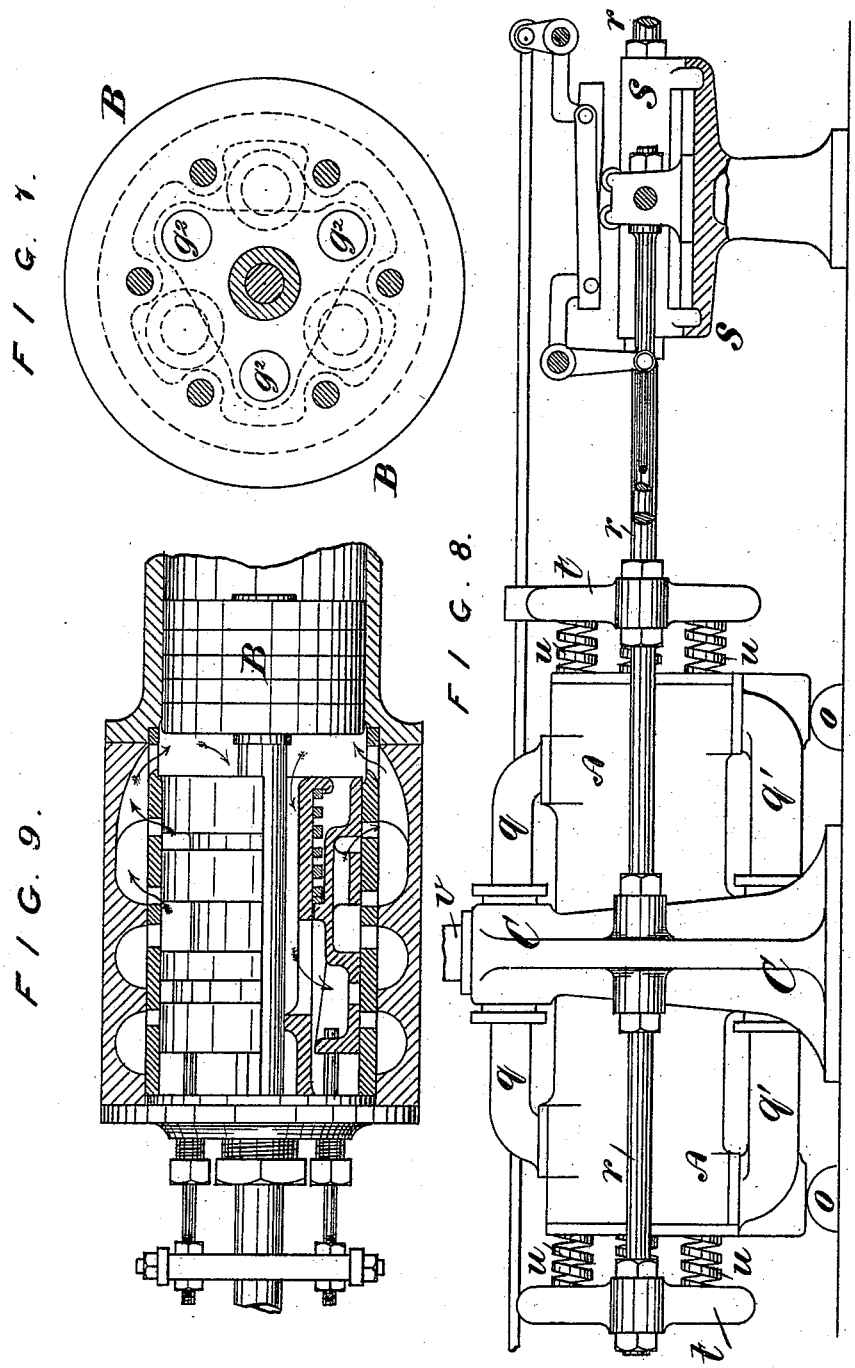
Witnesses
H. deVos
E. L. Richards
INVENTOR
Thomas Deakin
By his Attorneys

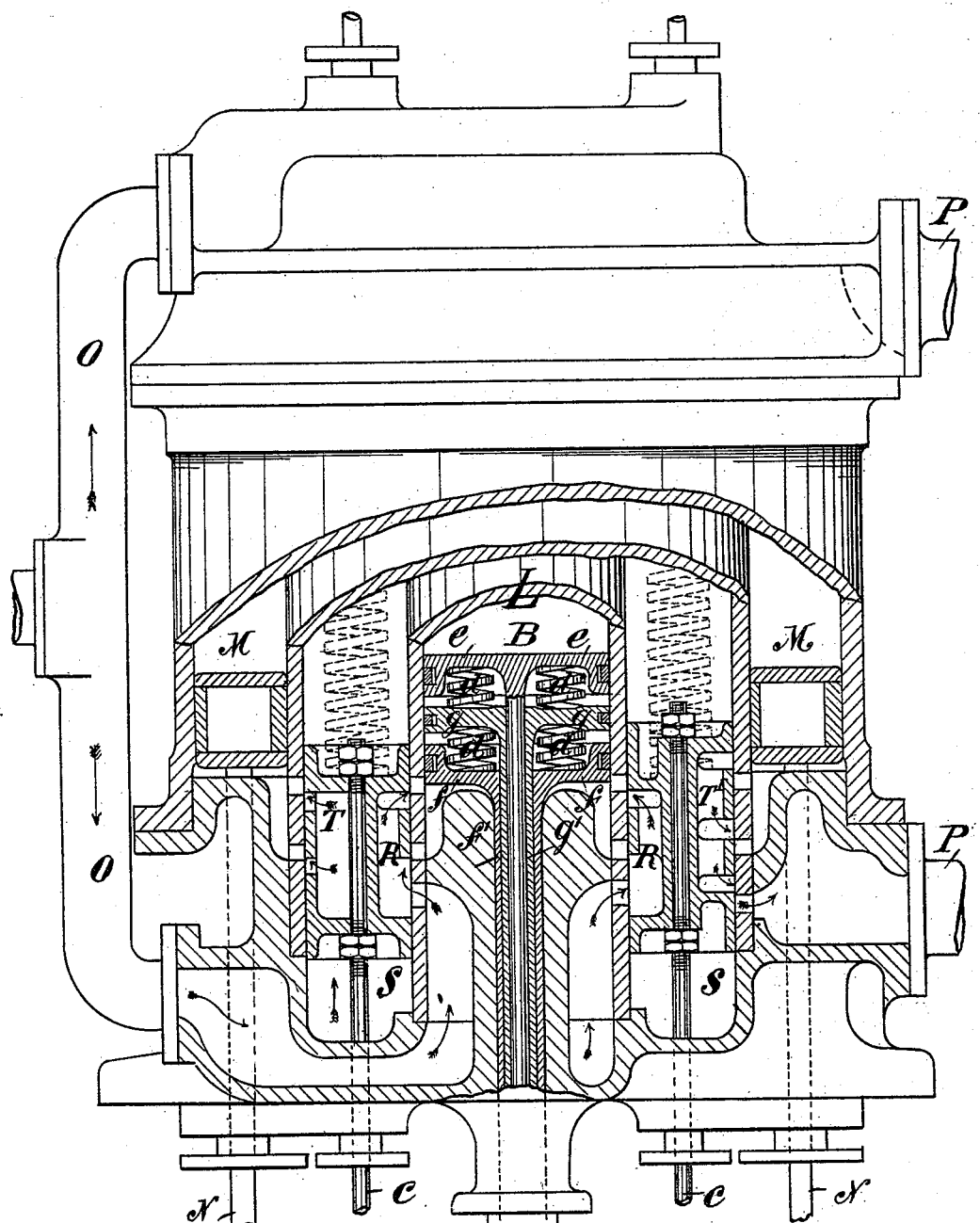

UNITED STATES PATENT OFFICE.

THOMAS DEAKIN, OF ECCLES, ENGLAND.

VALVE-GEAR FOR REGULATING THE SPEED OF MOTORS.

SPECIFICATION forming part of Letters Patent No. 464,661, dated December 8, 1891.

Application filed March 18, 1890. Serial No. 344,311. (No model.) Patented in England February 19, 1889, No. 2,875.

*To all whom it may concern:*

Be it known that I, THOMAS DEAKIN, a subject of the Queen of Great Britain and Ireland, residing at Eccles, near Manchester, in the county of Lancaster, England, have invented new and useful Improvements in Valve-Gear for Regulating the Speed of Motors, (for which I have obtained Letters Patent in Great Britain, No. 2,875, dated February 19, 1889,) of which the following is a full, clear, and exact description.

My said invention relates to improvements in prime motors, chiefly to those actuated by fluid-pressure, and especially to novel methods of regulating and governing the speed and power of such motors.

By means of my invention I am enabled to dispense with the customary governors, excentrics, cams, quadrants, reversing-links, and other means usually employed to operate the valves for admitting, cutting off, and exhausting the fluid-pressure and for reversing the engine, and in addition to this I cause the varying resistance or load upon the piston of the engine or motor directly to operate the valves, so as to give an increased or lessened supply of steam or other fluid pressure to the piston or part operated by the said fluid-pressure.

Stated briefly, the gist and principle of my invention consist in making one or more of the parts through which the work of the fluid-pressure is transmitted elastic—that is to say, compressible or extensible—and thus presenting surfaces or operating parts which act directly upon the valve-spindles or gear, so as to open or close the valves more or less, accordingly as more or less pressure is required.

In carrying my invention into effect I might make the cross-head elastic, or the piston or cylinder or other part, the practical construction of these elastic parts and the corresponding valve connections being fully illustrated in the annexed five sheets of drawings, to which I will now refer.

Figure 1:
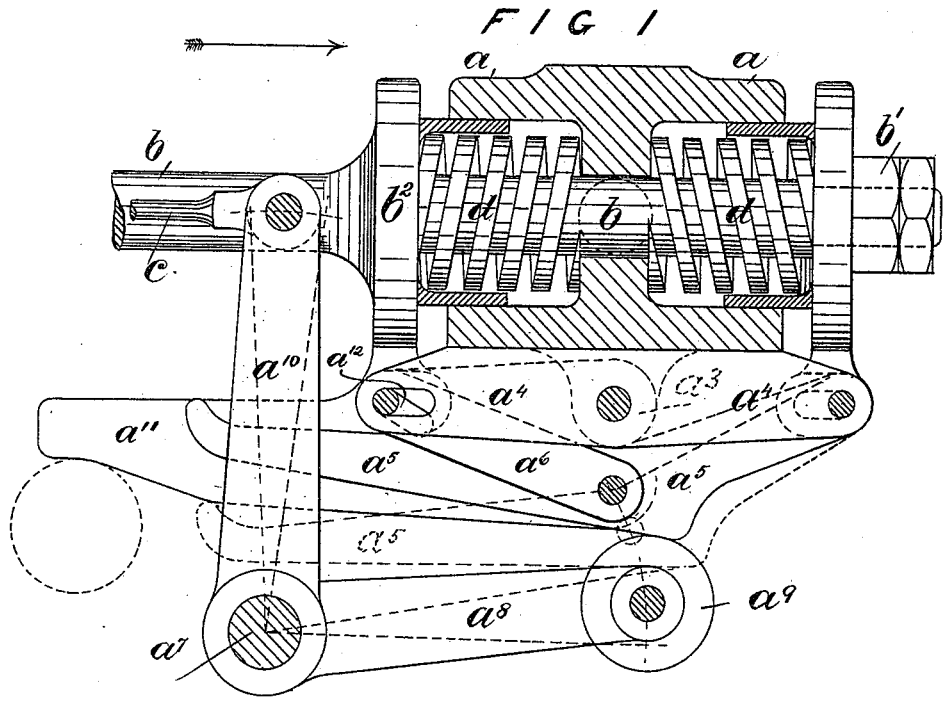
Figure 2:
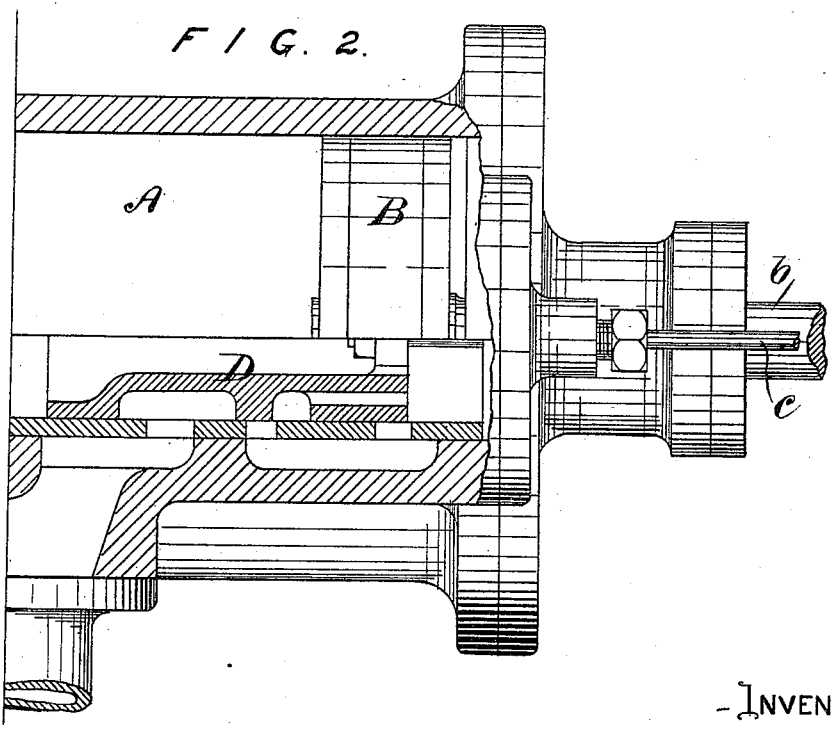
Figure 3:
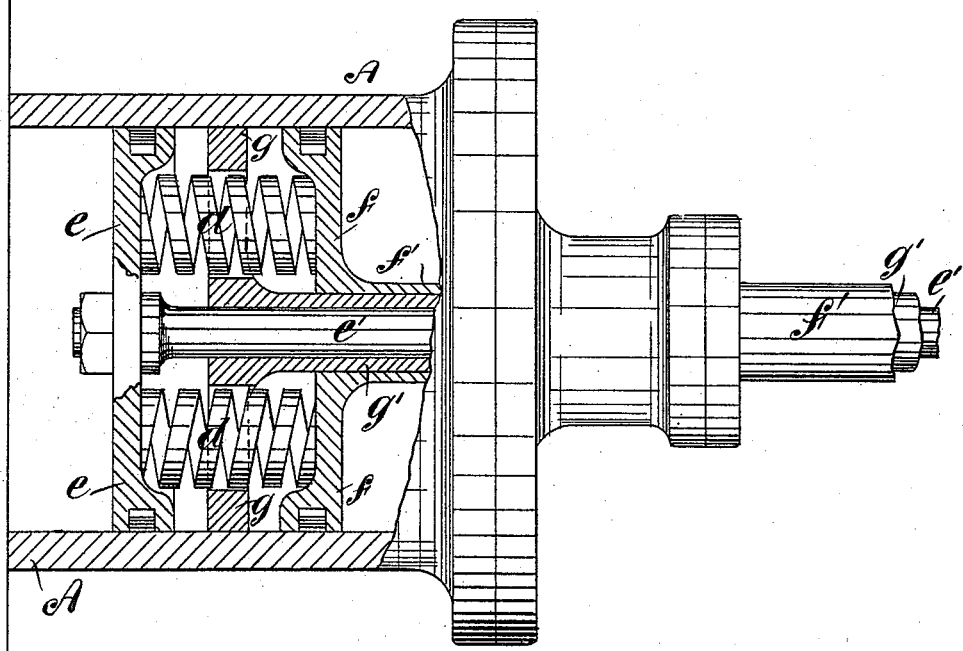
Figure 4:
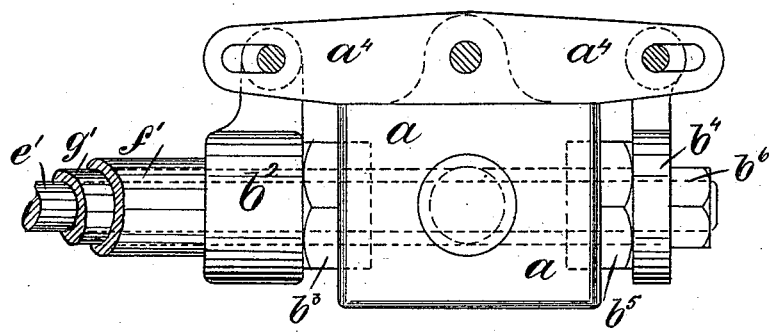

In the drawings, on Sheet 1, Figure 1 is a sectional view of an elastic cross-head. Fig. 2 is a sectional view of the front half of a steam-cylinder, showing the piston and one of the valves. On Sheet 2, Fig. 3 is a sectional view of an elastic piston shown in position in a cylinder. Fig. 4 is a side view of a cross-head which may be used in connection with the elastic piston. On Sheet 3, Fig. 5 is a plan view of a portion of a steam-engine with elastic piston and other elastic parts, which will be hereinafter fully described. Fig. 6 is a side elevation of Fig. 5. On Sheet 4, Fig. 7 is a front view of the elastic piston. Fig. 8 is a side elevation of an engine having an elastically-suspended cylinder. Fig. 9 is a sectional view of a valve-chest and valve in conjunction with an elastic piston. On Sheet 5, Fig. 10 is a view, partly in section, of a compound-engine cylinder, showing the valve-chest.

In all of the foregoing drawings similar letters indicate similar parts.

Referring to Sheet 1 of the drawings, Fig. 1 is a sectional view of an elastic cross-head made according to my invention. I make the elastic cross-head of suitable length, and I recess the central block $a$ at each end to receive elastic spiral or volute springs $d\,d$, abutting against a central collar or stop $a^2$. The piston-rod $b$ passes through the springs and cross-head and is secured to the cross-head by double nuts $b'$ and a flange $b^2$ or by other suitable means. The springs are adjusted to a fixed pressure and range. On the lower side of the cross-head a central snug $a^3$ is formed, to which are attached side plates $a^4$ for carrying the incline levers $a^5$, one such lever being provided for each valve. It will be understood that the arrangement for one valve only is shown. The levers $a^5$ are hinged between the fixed side plates $a^4$, and are connected by movable links $a^6$ to the flange $b^2$ on the piston-rod $b$. At right angles to the piston-rod two weigh or rock shafts $a^7$ (of which one only is shown in Fig. 1) are carried in suitable bearings on the slide-carriers or in any convenient position, on which shafts are fixed levers $a^8$, with friction-rollers $a^9$ on the ends. The weigh-shaft $a^7$ is connected to the valve-rod $c$ by means of the levers $a^{10}$. The friction-rollers are depressed by the incline levers $a^5$ as the cross-head moves, say, in the direction of the arrow, and when the piston is at the end of its stroke the incline levers $a^5$ on the cross-head have opened the valve to lead. According to the load on the piston will be the compression of the springs $d\,d$ in the cross-head and the corresponding movement of the incline levers $a^5$, which open the valves. It will be understood that the motion for only one end of the cylinder is shown at Fig. 1, the other half being left out, lest it should confuse the drawings. The springs $d$ $d$ are adjusted to the initial pressure of the steam—that is to say, if a full load is on equivalent to the full power of the engine the steam-ports will be full open, so that the resistance at the cross-head is at once met by the springs $d$ $d$ closing or being compressed, and thus pushing down the incline levers $a^5$, so as to open the valves. The steam is therefore accurately measured out to the requirements of the load, and as the steam-chest is in direct connection with the boiler wire-drawing of the steam between the boiler and the valves is not possible. Alongside the incline levers $a^5$ I place catch or release plates $a^{11}$, which carry the friction-rollers $a^9$ to a given point, holding the valve which has been closed to cut off the steam to any determined point of expansion. The speed of the engine is determined by running the engine without load, fixing the lead to give the required number of revolutions.

I will now explain the automatic action of the elastic cross-head. When the load comes upon the piston-rod $b$, the force at once acts against the springs $d$ $d$, compressing them and forcing down the incline levers $a^5$ by means of the links $a^6$ to the position shown in dotted lines, thus opening the valves through the action of the weigh-shaft levers till the power is balanced and continued till the release or catch plates $a^{11}$ allow the friction-rollers $a^9$ to rise clear of everything and open the exhaust-ports full. If the engine is heavily loaded or to its full power, the incline levers are lifted, as indicated in dotted lines, to give full port and prolonged supply of steam, and as the release-point fixed on the catch-plates would not be early enough for release or exhaust at full load the catch-plates are taken farther out of the way by being forced down by the oblique slot $a^{12}$, working on the joint-pins of incline levers at the opposite ends of the cross-head, so that by the action of the levers $a^5$ and release-plates $a^{11}$, which work toward and away from each other similar to the action of the blades of a pair of scissors, I secure automatically a variable cut-off and expansion to meet any degree of load and giving a uniform speed. The lengths of the incline levers and catch-plates are proportioned to the stroke and the determined degree of expansion for the engine without load and with full load, all intermediate degrees of expansion being automatic, according to the demands on the engine, a light load giving early cut-off (secured by the falling away of the plates $a^5$) and late exhaust (secured by the advanced position of the exhaust-plates $a^{11}$) and a heavy load late cut-off and early exhaust by conditions exactly the converse. The movement of the valve in the cylinder may be followed from the sectional view, Fig. 2, in which the cylinder is marked A, the piston B, and the valve D. The valve D and piston B, as shown in Fig. 2, are in the proper relative position for the return stroke; but in Fig. 1 the parts on the cross-head are shown in position for the back end valve with the piston at the back end of the cylinder.

Referring to Fig. 3, Sheet 2, of the drawings, which is a sectional view of an elastic piston, the piston is composed of front and back junk-rings $e$ and $f$, and it contains a central disk $g$, carrying a sleeve $g'$, which passes through the hollow piston-rod $f'$ to the cross-head. The back junk-ring $e$ is bolted to the central rod $e'$, which passes through the hollow sleeve $g'$. The elastic functions of the piston are obtained from a series of helical springs $d$, which in the drawings are placed between the front and back junk-rings $e$ $f$ and passing through holes in the central disk $g$, the springs being compressed when the pressure upon one side or the other of the piston is greater than the resistance of the springs $d$.

The cross-head shown in Fig. 4 may be used in conjunction with the piston shown in Fig. 3. In this view I have omitted the incline and other levers, as these have been already explained in reference to Fig. 1. The collar $b^2$ is screwed upon the end of the hollow sleeve $f'$. The sleeve $g'$ is secured to the cross-head by the jam-nuts $b^3$ and $b^5$. The collar $b^4$ is carried on the central rod $e'$ and is held by the nut $b^6$. The pressure of the steam against the junk-rings overcomes the resistance of the springs $d$, and by causing the piston slightly to collapse forces the collar $b^2$ or the collar $b^4$ from the center of the cross-head $a$, so as to lift the incline levers, which are not shown at Fig. 4, but are similar to those marked $a^5$ in Fig. 1, Sheet 1.

Fig. 5 on Sheet 3 is a plan view of part of a steam-engine, showing cylinder, elastic piston, and valve-motion and valves, together with an arrangement of compensating lever for maintaining a uniform travel of the valves under varying boiler-pressures.

Fig. 6 is a partial side elevation of Fig. 5.

The steam-cylinder A, Fig. 5, is shown partly in section, and the piston shown in section illustrates two different types of piston in the same view. In the half of the piston which is marked B the central plate $g$ carries on each side a number of small pistons $g^2$, (three such small pistons on each side would be a useful number,) the said small pistons projecting through holes in the front junk-ring $f$ and back ring $e$. The springs $d$, which hold the central plate $g$ in equilibrium against the steam-pressure on the small pistons $g^2$, are interposed between the central plate $g$ and the back and front junk-rings $e$ and $f$, a spring being provided to act against each piston. The central plate $g$ is connected by a nut to a central piston-rod $g'$, which is contained within a hollow sleeve $f'$, which is formed in one piece with the front junk-ring $f$. The sleeve $f'$ projects forward to the cross-head $a$ and carries the collar $b^3$, as seen more clearly in Fig. 6. The central rod $g'$ passes through the cross-head and carries the collar $b^4$. When the steam-pressure on the smaller pistons $g^2$ overcomes the resistance of the springs $d$ from either side of the piston, the central plate $g$ is moved toward the back or front of the piston, and the collar $b^2$ or $b^4$ drawn closer to or pushed farther from the cross-head $a$, whereby the rollers $a^9$ are raised or lowered by means of the links $a^6$, thus lifting or lowering the lifting-bar $a^5$, which is pivoted at $a^{11}$. The lifting-bar $a^5$ is slotted at the back end, so as to move endwise on the pivot $a^{11}$, which is shifted by the lever-arm $k$.

Fig. 6$^a$ is a side view of the lifting-bar $a^5$. The cut-off and exhaust lifting-bar is marked $a^{12}$. It is pivoted at $a^{13}$ and is shown in plan at Fig. 6$^b$. The bar $a^5$ works within the gap. The lifting-bar $a^5$ is connected by the adjustable compensating lever-arm $k$ to a boss $l$ on a rocking shaft $l'$, which also carries a vibrating lever $l^2$, which reciprocates the valve-rod $m$, connected to the cylindrical valve D. It will be evident that as the arm $k$ is lengthened or shortened the rocking motion of the boss $l$ will be increased or diminished, and consequently the travel of the valve D varied. It will also be evident that if no such compensating arrangement were provided and the boiler-pressure were to fall the rollers $a^9$ would not be lifted high enough to reach the plates and give the proper travel to the valve. By the compensating means shown this difficulty is avoided. The arm $k$ is prolonged through the boss $l$ and is connected to a piston $n$, working in a cylinder N on the top of the cylinder A. In front of or behind the piston $n$ I place a spring $n'$, and I connect the cylinder-space on the other side of the piston $n$ to the steam-supply, the spring $n'$ being set to normal boiler-pressure. When the boiler-pressure falls below this normal figure, the spring $n'$ overcomes the steam-pressure and pushes the piston $n$ to the steam end of the cylinder, thus pulling the arm $k$ inward and shortening the radius of the pivot center $a^{11}$. Consequently, although the lifting-plate may be lifted less, yet the shortening of the arm $k$ increases the movement of the lever $l^2$, so that the travel of the valve D is not diminished. The cut-off and exhaust lifting-bar $a^5$ is connected by a link $x$ to the top of the rocking boss $l$, thus making the movements of the exhaust-bar $a^5$ correspond to the movements of the lifting-bar $a^{12}$, so as to hasten or delay the exhaust, according to the load on the engine.

Referring again to Fig. 5 and the half of the piston marked B$'$, it will be seen that although the smaller pistons $g^2$ appear on one side the springs $d$ are not shown opposite to the pistons $g^2$. Instead of placing these springs $d$ in the piston, as in the half B, I place the springs on the valve-rods $m$, as shown in Fig. 5. The pistons $g^2$ in junk-ring $e$ force the collar $b^2$ and lift the roller $a^9$ and lifting-bar $a^5$.

Fig. 7 on Sheet 4 is a face view of the piston B, the section of which is shown at Fig. 5.

Fig. 8 illustrates the application of my invention to an elastic steam-cylinder, which is suspended between elastic points of support, so as to move and when requisite supply further steam to the piston after lead has been given. The cylinder A is placed on friction-rollers O, or it may be suspended in any convenient way to insure free action. As illustrated, the cylinder is placed inside a strong central standard C, on which are cast inlet and outlet stuffing-boxes for pipes $q$ $q'$. The standard is secured by stays $r$ to the slide-fixing $s$, the said stays $r$ extending through to the crank-shaft fixing, so as to bind the whole together. At each end of the cylinder is placed a strong ring or abutment $t$, with spaces between them and the cylinder ends or steam-chest covers to receive spiral or volute springs $u$. These rings or abutments $t$ are secured to the standard by nuts on the longitudinal stays $r$ and other smaller bolts above and below the center line of engine. The rings or abutments $t$ are adjustable, so as to give the full working pressure of the steam, and the springs are made to suit any initial pressure. The valves which are contained in each end of the cylinder (and suitable for the engine shown in Fig. 8) are shown in section at Fig. 9 and are operated by such a valve-motion as has been already described, the valve-motion giving lead, cut-off, and exhaust only, the movement of the elastic cylinder giving its own supply. The valves are merely shown to make the working of the engine clear, as they form no part of my invention. The steam-pipe $v$ from the boiler is fixed on the standard C, steam passing through pipes $q$ $q$, bolted on the end of the steam-chests with their ends in stuffing-boxes formed in the standard C. The motion of the cylinder in an ordinary-sized engine is about one inch each way, causing very little friction or wear.

Fig. 10 on Sheet 5 of the drawings illustrates, partly in section and partly in side elevation, a cylinder upon the compound principle and suitable for marine or other purposes. The internal cylinder L contains the high-pressure piston B, which is made elastic by the addition of springs $d$ between the back and front junk-rings, as already described with reference to foregoing examples. The central disk $g$ is attached to the cross-head by the hollow extension-rod $g'$, the outer hollow piston-rod $f'$, the said hollow extension $g'$, and the central back junk-ring rod $e'$ being respectively shown protruding from each other at the foot of the figure. The low-pressure annular piston M is attached to the cross-head by any suitable number of piston-rods N. The high and low pressure piston-rods will be attached to the same cross-head or they may be attached to different cross-heads. When the engine is at work, the supply of steam comes through the pipe O. The exhaust-pipe branches are marked P. The steam-supply flows in the direction of the arrows first to the high-pressure cylinder L, and thence when it has been exhausted through the valves R into the steam-chamber S, from whence the steam is delivered to the low-pressure piston through the valves T on the left-hand side of the drawings. The valves are operated in an upward direction through the valve-rods $c$ by the valve-motion on the cross-head and are assisted in the direction to exhaust by the spiral springs, which are shown in dotted lines. The steam is finally exhausted from the low-pressure cylinder through the valve T' (shown on the right-hand side of drawings) into the pipes P and is conducted to the condenser or to another engine or engines.

Two or more of the compound cylinders first described might be arranged together, so as to use the steam expansively any suitable number of times—viz., triple, quadruple, or sextuple expansion.

I claim—

In a steam-engine or other fluid-pressure motor, an elastic piston containing a series of small pistons, in combination with springs on the valve-rods, the said elastic piston being so constructed that when the elastic media yield to the steam-pressure on one side or the other of the piston the piston shall slightly collapse, the movement of the piston being communicated by means of the piston-rod to the cross-head and lifting-bars which operate the valve or valves, for the purposes and substantially as hereinbefore described, and as illustrated in the drawings.

In witness whereof I have hereunto set my hand in presence of two witnesses.

THOMAS DEAKIN.

Witnesses:
 JOSHUA ENTWISLE,
 FREDK. DILLON.